United States Patent Office 3,314,979
Patented Apr. 18, 1967

3,314,979
NOVEL BENZAMIDINES
Andre Allais, Les Lilas, and Pierre Girault, Paris, France, assignors to Roussel-UCLAF, Paris, France, a corporation of France.
No Drawing. Filed Feb. 20, 1964, Ser. No. 346,107
Claims priority, application France, Feb. 25, 1963, 925,916; July 5, 1963, 940,550
6 Claims. (Cl. 260—397.7)

The invention relates to novel N-n-butyl-N'-(3-chloro-4-sulfamidophenyl)benzamidines of the formula

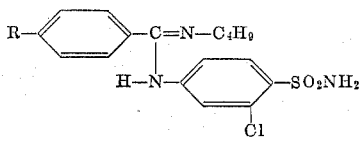

wherein R is selected from the group consisting of hydrogen, halogen and a lower alkoxy radical having 1 to 6 carbon atoms and their non-toxic, pharmacologically acceptable acid addition salts and to a novel process for their preparation. The invention also relates to novel intermediates thereof.

The N-n-butyl-N'-(3-chloro-4-sulfamidophenyl) - benzamidines of Formula I have interesting pharmacological properties, particularly a remarkable anticalciuric activity.

It is an object of the invention to provide novel N-n-butyl-N'-(3-chloro-4 - sulfamidophenyl) - benzamidines of Formula I and their acid addition salts.

It is another object of the invention to provide novel intermediates for N-n-butyl-N'-3 - chloro - 4 - sulfamido phenyl)-benzamidines of Formula I.

It is a further object of the invention to provide a novel process for the preparation of N-n-butyl-N'-(3-chloro-4-sulfamidophenyl)-benzamidines of Formula I.

It is an additional object of the invention to provide novel anticalciuric compositions.

It is another object of the invention to provide a novel method for treating hypercalciuria.

These and other objects and advantages of the invention will become obvious from the following detailed description.

The novel compounds of the invention are benzamidines selected from the group consisting of N-n-butyl-N'-(3-chloro-4-sulfamidophenyl)-benzamidines of the formula

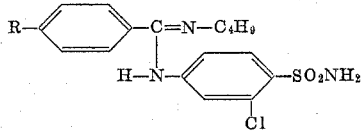

wherein R is selected from the group consisting of hydrogen, halogen and lower alkoxy having 1 to 6 carbon atoms and their non-toxic, pharmacologically acceptable acid addition salts.

Examples of suitable acids for the formation of non-toxic, pharmacologically acceptable acid addition salts are organic acids such as acetic acid, citric acid, tartaric acid, etc. and inorganic acids such as sulfuric acid, hydrochloric acid etc.

The novel process of the invention for the preparation of the N-n-butyl-N'-(3-chloro-4-sulfamidophenyl) - benzamidines of Formula I comprises reacting n-butylamine with a benzoyl chloride of the formula

wherein R has the above definition to form the corresponding N-n-butylbenzamide, reacting the latter with a chlorinating agent such as thionyl chloride or phosphorus pentachloride to form the corresponding N-n-butylbenzimine chloride and condensing the latter with 3-chloro-4-sulfamido-aniline to form the corresponding N-n-butyl-N'-(3-chloro-4-sulfamidophenyl)-benzamidine which may be reacted with an organic or inorganic acid to form the acid addition salt.

Examples of suitable benzoyl chlorides of Formula II are benzoyl chloride, p-fluoro-benzoyl chloride, p-chloro-benzoyl chloride, p-bromobenzoyl chloride, p-iodobenzoyl chloride, p-methoxybenzoyl chloride, p-ethoxybenzoyl chloride, p-butoxybenzoyl chloride, etc.

A preferred mode of the process for the N-n-butyl-N'-(3-chloro-4-sulfamidophenyl)-benzamidines of Formula I comprises reacting n-butylamine with a benzoyl chloride of Formula II in the presence of a tertiary amine such as triethylamine to form the corresponding N-n-butyl benzamide, reacting the latter with thionyl chloride to form the corresponding N-n-butyl benzimine chloride and reacting the latter in an inert organic solvent such as ethyl acetate with 3-chloro-4-sulfamido aniline in the presence of a tertiary amine such as triethylamine to form the corresponding N-n-butyl-N'-(3 - chloro - 4 - sulfamidophenyl)-benzamidine. The reaction scheme is illustrated in Table I.

TABLE I

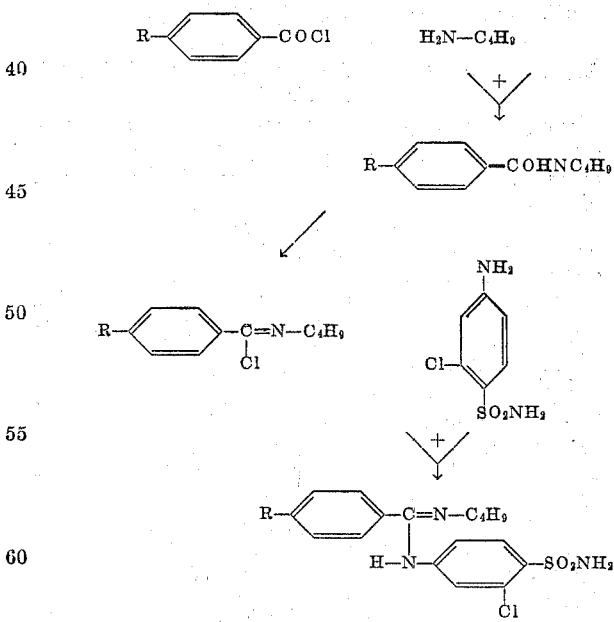

wherein R has the above definition.

The novel anticalciuric compositions of the invention are comprised of a benzamidine selected from the group consisting of N-n-butyl-N'-(3-chloro-4-sulfamidophenyl)-benzamidines of the formula

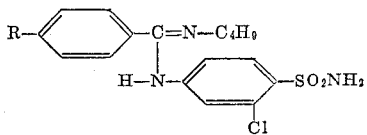

wherein R is selected from the group consisting of hydrogen, halogen and lower alkoxy having 1 to 6 carbon atoms and their non-toxic, pharmacologically acceptable acid addition salts and a major amount of a pharmaceutical carrier. The compositions may be prepared in the form of injectable solutions or suspensions, prepared in ampules, in multiple-dose flacons, in the form of tablets, coated tablets and of suppositories prepared in the usual manner.

The novel method of treating hypercalciuria in warm blooded animals comprises administering an effective amount of a benzamidine selected from the group consisting of N-n-butyl-N'-(3-chloro-4-sulfamidophenyl)-benzamidines of the formula

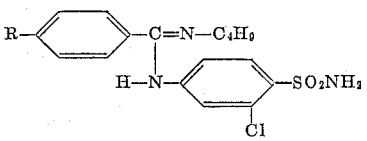

wherein R is selected from the group consisting of hydrogen, halogen and lower alkoxy having 1 to 6 carbon atoms and their non-toxic, pharmacologically acceptable acid addition salts. The usual useful daily dose is between 0.20 and 1.50 gm. in the adult depending upon the particular benzamidine and the method of administration which may be oral, transcutaneous or rectal. For example, the effective daily dosage in the adult is 0.20 to 1.50 gm. for N - n - butyl-N'-(3-chloro-4-sulfamidophenyl)-p-methoxybenzamidine and 0.20 to 1.20 gm. for N-n-butyl-N'-(3-chloro - 4 - sulfamidophenyl)-p-chlorobenzamidine. Preferably the dosologic unit is comprised between 0.10 and 0.50 gm.

In the following examples there are described several preferred embodiments to illustrate the invention. However it should be understood that the invention is not intended to be limited to the specific embodiments.

EXAMPLE I.—PREPARATION OF 3-CHLORO-4-SULFAMIDO-ANILINE

*Step A: Preparation of 1-acetamido-benzene-3-chloro-4-sulfonyl chloride*

520 gm. of sulfuric chlorohydrin were introduced into a balloon flask and the flask was cooled to 8° C. under agitation. Then, while continuing the agitation 150 gm. of monochloroacetanilide were added in small fractions while the temperature was maintained at 15° C. Next the reaction mixture was heated slowly for about 2 hours in order to arrive at a temperature of 43° C. and then the reaction mixture was heated more rapidly in order to bring the temperature to 70° C. at which temperature the reaction mixture was maintained for 6 hours. A very thick solution was obtained which was poured slowly onto ice while energetically agitating which caused precipitation. The precipitate was filtered, washed by six triturations with some 200 cc. of distilled water each and dried under vacuum to obtain 123 gm. of the raw chloride of 1-acetamido-benzene-3-chloro-4-sulfonyl melting at 94° C. The product was a white solid soluble in acetone and insoluble in water, alcohol, ether, benzene and chloroform. This product has already been described by English (J. of Am. Chem. Soc. 68, 453, 1946). The product is utilized as such for the next step of the synthesis.

*Step B: Preparation of 3-chloro-4-sulfamido-acetanilide*

100 gm. of 1-acetamido-benzene-3-chloro-4-sulfonyl chloride and 400 cc. of 22° Bé. ammonium hydroxide solution were introduced into a balloon flask and 30 cc. of distilled water were added thereto. The reaction mixture was heated to reflux and a dissolution occurred followed by crystallization. The reaction mixture was maintained for 10 minutes at reflux after which the precipitate formed was filtered, washed by four triturations with 150 cc. of water each and dried under vacuum to obtain 59 gm. of a product melting at 186° C. This product was purified by recrystallization from water, then from ethanol to obtain 3-chloro-4-sulfamido-acetanilide having a melting point of 200° C.

The product occurred in the form of a white solid body soluble in moderately warm aqueous diluted alkalis and insoluble in ether, acetone, benzene and chloroform.

*Analysis.*—$C_8H_9O_3N_2ClS$; molecular weight=248.70. Calculated: C, 38.63%; H, 3.64%; N, 11.27%; Cl, 14.25%; S, 12.89%. Found: C, 38.7%; H, 3.8%; N, 11.1%; Cl, 14.2%; S, 12.9%.

*Step C: Preparation of 3-chloro-4-sulfamido-aniline*

50 gm. of 3-chloro-4-sulfamido-acetanilide in 500 cc. of 5 N hydrochloric acid solution were introduced into a balloon flask and the reaction mixture was heated to reflux for a period of 15 minutes and thereafter filtered. The precipitate formed was washed twice with 10 cc. of 5 N hydrochloric acid and the filtrate was combined with the wash liquors. Thereafter, the filtrate was cooled and 200 cc. of ammonia solution were added thereto. The product precipitated and the suspension was iced and filtered. The residue was washed by four triturations with 30 cc. of distilled water each and dried under vacuum to obtain 28.7 gm. of a product melting at 175–176° C. This product was recrystallized three times from ethanol to obtain 3-chloro-4-sulfamido-aniline having a melting point of 180° C.

The product occurred in the form of a solid white product soluble in acetone and insoluble in water, alcohol, ether, benzene and chloroform.

*Analysis.*—$C_6H_7O_2N_2ClS$; molecular weight=206.66. Calculated: C, 34.87%; H, 3.41%; O, 15.48%; N, 13.56%; S, 15.52%; Cl, 17.15%. Found: C, 34.9%; H, 3.6%; O, 15.4%; N, 13.2%; S, 15.2%; Cl, 17.3%.

EXAMPLE II.—PREPARATION OF N-n-BUTYL-N'-(3 - CHLORO - 4 - SULFAMIDOPHENYL) - p - METHOXYBENZAMIDINE

*Step A: Preparation of N-n-butyl-p-methoxybenzamide*

21.4 gm. of n-butylamine, 29.6 gm. of triethylamine and 150 cc. of anhydrous benzene were introduced into a balloon flask and then a solution of 50 gm. of p-methoxybenzoyl chloride in 50 cc. of anhydrous benzene were slowly added thereto while the temperature was maintained between 0 and 10° C. The reaction mixture was filtered and the residue was washed by two triturations of 30 cc. of benzene each. The benzenic solutions were combined and washed three times with 50 cc. of distilled water. The aqueous phase was dried over sodium sulfate, filtered and the residue was rinsed with 20 cc. of benzene. The combined benzenic solution was evaporated to dryness to obtain 52 gm. of N-n-butyl-p-methoxybenzamide melting at 46–48° C. which was purified by three crystallizations from hexane whereby the product had a melting point of 48–50° C.

The product occurred in the form of white needles soluble in alcohol, ether, acetone, benzene and chloroform and insoluble in water.

*Analysis.*—$C_{12}H_{17}O_2N$; molecular weight=207.27. Calculated: C, 69.53%; H, 8.26%; N, 6.75%. Found: C, 69.7%; H, 8.3%; N, 6.9%.

This product is not described in the literature.

*Step B: Preparation of N-n-butyl-p-methoxybenzimino chloride*

20 gm. of N-n-butyl-p-methoxybenzamide and 34.4 gm. of thionyl chloride were introduced into a balloon flask and the reaction mixture was heated to reflux for a period of two hours. Then the excess of thionyl chloride was removed by distillation at 60–80° C. under vacuum to obtain 11.7 gm. of N-n-butyl-p-methoxybenzimino chloride.

The product occurred in the form of a liquid product miscible with alcohol, ether, acetone, benzene and chloroform and immiscible with water. The product was utilized as such for the next step of the synthesis.

This product is not described in the literature.

*Step C: Preparation of N-n-butyl-N'-(3-chloro-4-sulfamidophenyl)-p-methoxybenzamidine*

8.2 gm. of 3-chloro-4-sulfamido-aniline prepared in Example I, 200 cc. of ethyl acetate and 10 gm. of N-n-butyl-p-methoxybenzimino chloride were introduced into a balloon flask and the reaction mixture was agitated and 8 cc. of triethylamine were added thereto. The reaction mixture was heated to 50° C. for a period of three hours while maintaining the agitation and then the mixture was cooled. The triethylamine hydrochloride formed was vacuum filtered and the precipitate was washed with ethyl acetate. The combined organic solutions were washed with water and then extracted twice with 100 cc. of normal sulfuric acid. The aqueous sulfuric acid solution was washed with 100 cc. of ether and then rendered alkaline with a saturated solution of sodium bicarbonate. The precipitate obtained was vacuum filtered, washed with water and dried to obtain 6.5 gm. of N-n-butyl-N'-(3-chloro-4-sulfamidophenyl)-p-methoxybenzamidine melting at 171–172° C. which upon purification by crystallization from alcohol, then from ethyl acetate had the same melting point.

The product occurred in the form of white needles soluble in dilute aqueous acids, acetone, chloroform and insoluble in water, ether and benzene.

*Analysis.*—$C_{18}H_{22}O_3ClSN_3$; molecular weight=395.9. Calculated: C, 54.60%; H, 5.6%; N, 10.61%; Cl, 8.95%; S, 8.10%. Found: C, 54.8%; H, 5.7%; N, 10.5%; Cl, 9.0%; S, 8.1%.

This product is not described in the literature.

EXAMPLE III.—PREPARATION OF N-n-BUTYL-N'-(3-CHLORO-4-SULFAMIDOPHENYL)-p-CHLOROBENZAMIDINE

*Step A: Preparation of N-n-butyl-p-chlorobenzamide*

A mixture of 180 cc. of ether, 45 cc. of anhydrous triethylamine and 30 cc. of anhydrous n-butylamine was cooled under agitation to +5° C. and then 50 gm. of p-chlorobenzoyl chloride were slowly added thereto while the temperature was maintained between +5° and +10° C. The mixture was agitated for one hour at room temperature and water was added thereto and the aqueous phase decanted. The ethereal solution recovered was washed successively with water, with N sodium hydroxide solution, with water, with N hydrochloric acid solution and again with water and then distilled to dryness to obtain 60 gm. of N-n-butyl-p-chlorobenzamide in the form of colorless prisms melting at 83–84° C.

This product with a melting point of 81–83° C. has already been described by Korger et al., Arz. Forsch, 10, 104 (1960).

*Step B: Preparation of N-n-butyl-p-chlorobenzimino chloride*

A mixture of 40 gm. of N-n-butyl-p-chlorobenzamide and 48 cc. of thionyl chloride was heated for 2 hours at reflux. The excess of the thionyl chloride was then distilled therefrom under vacuum and the oily residue obtained was distilled to obtain 38 gm. of N-n-butyl-p-chlorobenzimino chloride in the form of a colorless liquid product having a boiling point at 3 mm.=135–136° C. The said liquid was miscible with ether, acetone, benzene and chloroform.

This product is not described in the literature.

*Step C: Preparation of N-n-butyl-N'-(3-chloro-4-sulfamidophenyl)-p-chlorobenzamidine*

111 gm. of 3-chloro-4-sulfamido-aniline, 111 cc. of triethylamine and 2.755 cc. of ethyl acetate were added under agitation to 122 gm. of N-n-butyl-p-chlorobenzimino chloride. The reaction mixture was heated to 50° C. under agitation for a period of 3 hours and then cooled under agitation. The precipitate obtained was vacuum filtered and triturated with ethyl acetate. Thereafter it was washed with water until the wash waters were neutral and dried to obtain 101 gm. of raw N-n-butyl-N'-(3-chloro - 4-sulfamidophenyl) - p-chlorobenzamidine. The product was dissolved at reflux in ethanol and the solution was treated with animal carbon black, filtered and allowed to stand for crystallization while cooling toward 0° to +5° C. The crystals formed were then vacuum filtered and triturated with iced ethanol and dried to obtain 92 gm. of N-n-butyl-N'-(3-chloro-4-sulfamidophenyl)-p-chlorobenzamidine having a melting point of 221–222° C.

A second lot of 21.8 gm. of the product was recovered from the mother liquors obtained from the washing of the raw product which mother liquors were extracted with ethyl acetate. The extracts were added to the solvent of trituration with ethyl acetate, washed with water, treated with animal carbon black, filtered and distilled to dryness. The residue was taken up by the ethanolic mother liquors of the preceding operations and finally the process of purification was continued as in the case of the first lot.

The product was soluble in dilute aqueous acids, slightly soluble in acetone and insoluble in water, ether, benzene and chloroform.

*Analysis.*—$C_{17}H_{19}O_2N_3Cl_2S$; molecular weight=400.3. Calculated: C, 51.00%; H, 4.78%; Cl, 17.71%; N, 10.49%; S, 8.01%. Found: C, 51.3%; H, 4.9%; Cl, 17.7%; N, 10.5%; S, 8.1%.

This product is not described in the literature.

By reacting other benzoyl chlorides in the same manner as Examples II or III, other N-n-butyl-N'-(3-chloro-4-sulfamidophenyl)-benzamides of Formula I such as N-n-butyl - N'-(3-chloro - 4-sulfamidophenyl)-p-ethoxybenzamidine, N-n-butyl-N'-(3-chloro - 4-sulfamidophenyl)-p-butoxybenzamidine, N-n-butyl - N'-(chloro-4-sulfaminodophenyl)-p-bromobenzamidine and N-n-butyl-N'-(3-chloro - 4-sulfamidophenyl)-benzamidine can be prepared.

PHARMACOLOGICAL STUDIES

I.—*N-n-butyl-N'-(3-chloro-4-sulfaminophenyl)-p-methoxybenzamidine*

Lots of rats weighing 200 gm. grouped by pairs in metabolism cages received orally N-n-butyl-N'-(3-chloro-4-sulfamidophenyl)-p-methoxybenzamidine in suspension in carboxymethyl cellulose. Parallelly, other lots of rats received chlorothiazide as a comparative test. The rats remained six hours in the cages and they received no other nourishment at this time but they had access to a soaker containing distilled water. The urine excreted for the period of six hours was recovered over a solution of hydrochloric acid and their volumes were noted. The cages were then rinsed with hot acidulated distilled water.

The calcium was determined by complexometry and the orthophosphoric acid phosphorus was determined by colorimetry after formation of the phosphovanadomolybdic complex.

In each test which was conducted three times there was (a) a lot of 8 control rats (grouped by pairs), (b) a lot of 8 rats (grouped by pairs) treated at a dose of 50 mg./kg. of chlorothiazide and (c) one or two lots of rats (grouped by pairs) treated according to the test with doses of 10, 25 and 50 mg./kg. of N-n-butyl-N'-(3-chloro - 4-sulfamidophenyl) - p - methoxybenzamidine. The values in Table II represent the average values of the urinary excretion of two rats for six hours calculated on the daily results obtained in the course of each experiment repeated five consecutive days.

lated distilled water. The calcium was determined by complexometry and the orthophosphoric acid phosphorus war determined by colorimetry after formation of the

TABLE II

| Urinary excretion of 2 rats for period of 6 hrs. | Controls | | Chlorothiazide, 50 mg./kg. | N-n-butyl-N'-(3-chloro-4-sulfamidophenyl)-p-methoxybenzamidine | | |
|---|---|---|---|---|---|---|
| | | | | 10 mg./kg. | 25 mg./kg. | 50 mg./kg. |
| Volume of urine recovered in ml | (1)* | 5.5 | 9.4 | | | 5.8 |
| | (2) | 4.15 | 9.85 | 3.0 | 4.8 | |
| | (3) | 4.3 | 9.7 | 4.7 | | |
| Ca in μg | (1) | 1,292 | 610 | | | 695 |
| | (2) | 1,656 | 860 | 1,105 | 962 | |
| | (3) | 1,368 | 965 | 1,049 | | |
| Orthophosphoric phosphorus in μg | (3) | 4,933 | 4,749 | 4,941 | | |

*The values indicate the number of the experiment.

Table II shows that at all doses administered the effect of N - n - butyl-N'-(3-chloro-4-sulfamidophenyl)-p-methoxybenzamidine on urinary volume was weak or negligible, whereas clorothiazide doubled the urinary volume. At 50 mg. and at 25 mg./kg., the effect on the calciuria was comparable to that obtained with 50 mg./kg. of chlorothiazide. At 10 mg., the effect was weaker, but still notable. No effect on the phosphaturia was noted at a dose of 10 mg./kg.

(B) *Toxicity determination.*—N-n-butyl-N'-(3-chloro-4-sulfamidophenyl)-p-methoxybenzamidine in aqueous suspension was administered orally to 2 groups of 10 mice at doses of 500 and 100 mg./kg. at a volume of 0.4 cc. per mouse of 20 gm. After 8 days of observation, there were no mortalities nor any symptomatology. Therefore, the said product had absolutely no toxicity when administered to mice orally at a dose of 1000 mg./kg.

II.—*N-n-butyl-N'-(3-chloro-4-sulfamidophenyl)-p-chlorobenzamidine*

(A) *Anticalciuric action.*—Lots of rats weighing 200 gm. grouped by pairs in metabolism cages received orally N - n - butyl-N'-(3-chloro-4-sulfamidophenyl)-p-chlorobenzamidine in suspension in carboxymethyl cellulose. Parallelly, other lots of rats received chlorothiazide as a comparative test. The rats were kept 24 hours in the cages and they received no nourishment for this period but had access to a soaker containing distilled water. The urine excreted for a period of 24 hours was recovered over a solution of hydrochloric acid and their volumes were noted. The cages were then rinsed with hot aciduphosphovanadomolybdic complex. Sodium and potassium were determined by flame photometry.

In each test which was conducted three times there were utilized (a) one lot of 8 control rats (grouped by pairs), (b) one lot of 8 rats (grouped by pairs) treated at doses of 25 and 50 mg./kg. of chlorothiazide, and (c) one or two lots of rats (grouped by pairs) treated according to the test with doses of 25 and 50 mg./kg. of N-n-butyl - N' - (3 - chloro-4-sulfamidophenyl)-p-chlorobenzamidine. The values given in Table III represent the average values of the urinary excretion of two rats during 24 hours.

TABLE III

| Urinary excretion of 2 rats for period of 24 hrs. | Controls | Chlorothiazide | | N-n-butyl-N'-(3-chloro-4-sulfamidophenyl)-p-chlorobenzamidine | |
|---|---|---|---|---|---|
| | | 25 mg./kg. | 50 mg./kg. | 25 mg./kg. | 50 mg./kg. |
| Volume of urine recovered in cc | 28.3 | | 50.0 | | |
| | 21.6 | | | | 28.3 |
| | 13.9 | 20.4 | | | |
| | 14.6 | | | 19.5 | |
| Ca in μg | 3,926 | | 2,340 (−40.4%) | | |
| | 4,185 | | | | 2,375 (−43.2%) |
| | 2,970 | 1,497 (−49.6%) | | | |
| | 3,102 | | | 1,815 (−41.5%) | |
| p-Orthophosphoric phosphorus in μg | 44.9 | | | | 44.8 |
| | 30.5 | 35.7 | | 35.5 | |
| K in mg | 32.5 | | | | 114.0 |
| | 118.5 | | | | |
| | 90.9 | 95.6 | | | |
| | 99.4 | | | 94.1 | |
| Na in mg | 41.7 | | | | 49.9 (+19.7%) |
| | 27.2 | 35.5 (+30.5%) | | | |
| | 32.9 | | | 35.25 | |

Table III shows that N-n-butyl-N'-(3-chloro-4-sulfamidophenyl)-p-chlorobenzamidine administered orally has a clear anticalciuric effect at doses of 25 and 50 mg./kg. and that this effect is as pronounced as that of chlorothiazide administered at the same doses. Additionally, the variations of urinary volume are weak, the effect on natriuria positive at 50 mg./kg. is negligible at a dose of 25 mg./kg. and no effect on the phosphaturia and kaliuria can be noted at either dose with the said product of the invention.

(B) *Toxicity determination.*—N-n-butyl-N'-(3-chloro-4-sulfamidophenyl)-p-chlorobenzamidine in aqueous suspension was administered orally to lots of 10 mice of the Rockland strain weighing between 18 and 22 gm. at doses of 500 and 1000 mg./kg. in a volume of 0.2 and 0.4 cc. respectively, per mouse. After 8 days observation, there were no mortalities nor any symptomatology. Therefore, the said product had absolutely no toxicity when administered orally to mice at a dose of 1000 mg./kg.

Various modifications of the process and compositions

We claim:
1. A compound selected from the group consisting of a N-n-butyl-benzamidine of the formula

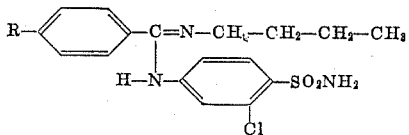

wherein R is selected from the group consisting of hydrogen, halogen and lower alkoxy having 1 to 6 carbon atoms and the non-toxic, pharmacologically acceptable acid addition salt.

2. N - n - butyl - N' - (3-chloro-4-sulfamidophenyl)-p-methoxybenzamidine.

3. A non-toxic, pharmacologically acceptable acid addition salt of N-n-butyl-N'-(3-chloro-4-sulfamidophenyl)-p-methoxybenzamidine.

4. N - n - butyl - N' - (3-chloro-4-sulfamidophenyl)-p-chlorobenzamidine.

5. A non-toxic, pharmacologically acceptable acid addition salt of N - n - butyl - N'-(3-chloro-4-sulfamidophenyl)-p-chlorobenzamidine.

6. N-n-butyl-p-methoxybenzamide.

References Cited by the Examiner

UNITED STATES PATENTS 2,211,280  8/1940  Martin et al. _____ 260—564
3,165,529  1/1965  Blatter _____ 260—564

OTHER REFERENCES

Houben-Weyl, Methoden der organischen Chemie, vol. 11/2, pp. 57–58 (1958).

Morrison et al., Organic Chem., p. 556 (1959), Allyn and Bacon Inc.

Ugi et al., Berichte, pp. 126–135 (January 1962), vol. 95.

WALTER A. MODANCE, *Primary Examiner.*

HARRY I. MOATZ, *Assistant Examiner.*